United States Patent
Vaidya et al.

(10) Patent No.: US 11,325,065 B2
(45) Date of Patent: May 10, 2022

(54) SULFUR RECOVERY OPERATION WITH IMPROVED CARBON DIOXIDE RECOVERY

(71) Applicants: SAUDI ARABIAN OIL COMPANY, Dhahran (SA); Membrane Technology and Research, Inc., Newark, CA (US)

(72) Inventors: Milind M. Vaidya, Dhahran (SA); Sebastien A. Duval, Dhahran (SA); Feras Hamad, Dhahran (SA); Richard Baker, Newark, CA (US); Tim Merkel, Newark, CA (US); Kaaeid Lokhandwala, Newark, CA (US); Ahmad A. Bahamdan, Dammam (SA); Faisal D. Al-Otaibi, Dhahran (SA)

(73) Assignees: SAUDI ARABIAN OIL COMPANY; MEMBRANE TECHNOLOGY AND RESEARCH, INC., Newark, CA (US)

( * ) Notice: Subject to any disclaimer, the term of this patent is extended or adjusted under 35 U.S.C. 154(b) by 71 days.

(21) Appl. No.: 16/877,415

(22) Filed: May 18, 2020

(65) Prior Publication Data

US 2020/0360854 A1    Nov. 19, 2020

Related U.S. Application Data

(60) Provisional application No. 62/849,242, filed on May 17, 2019.

(51) Int. Cl.
*B01D 53/22* (2006.01)
*C01B 32/50* (2017.01)
(Continued)

(52) U.S. Cl.
CPC ....... *B01D 53/229* (2013.01); *B01D 53/1443* (2013.01); *B01D 53/1475* (2013.01);
(Continued)

(58) Field of Classification Search
None
See application file for complete search history.

(56) References Cited

U.S. PATENT DOCUMENTS

| 3,896,215 A | 7/1975 | Bratzler et al. |
| 4,001,386 A | 1/1977 | Klein et al. |

(Continued)

FOREIGN PATENT DOCUMENTS

| WO | 9220431 | 11/1992 |
| WO | 2011124326 A1 | 10/2011 |
| WO | 2019060352 A1 | 3/2019 |

OTHER PUBLICATIONS

Alkatherli et al., "Tapping singular Middle Eastern ultra-sour gas resources combining membrane and absorption systems: potential for energy intensity reduction", Ind. Eng. Chem. Res. 2018, 57, 17, , 5748-5763.

(Continued)

*Primary Examiner* — Jason M Greene
(74) *Attorney, Agent, or Firm* — Bracewell LLP; Constance Gall Rhebergen

(57) ABSTRACT

A process for recovering sulfur and carbon dioxide from a sour gas stream, the process comprising the steps of: providing a sour gas stream to a membrane separation unit, the sour gas stream comprising hydrogen sulfide and carbon dioxide; separating the hydrogen sulfide from the carbon dioxide in the membrane separation unit to obtain a retentate stream and a first permeate stream, wherein the retentate stream comprises hydrogen sulfide, wherein the permeate stream comprises carbon dioxide; introducing the retentate stream to a sulfur recovery unit; processing the retentate stream in the sulfur recovery unit to produce a sulfur stream and a tail gas stream, wherein the sulfur stream comprises liquid sulfur; introducing the permeate stream to an amine (Continued)

absorption unit; and processing the permeate stream in the amine absorption unit to produce an enriched carbon dioxide stream.

23 Claims, 9 Drawing Sheets

(51) Int. Cl.
 *B01D 53/14* (2006.01)
 *B01D 71/32* (2006.01)
 *C01B 17/02* (2006.01)

(52) U.S. Cl.
 CPC ......... *B01D 53/226* (2013.01); *B01D 53/228* (2013.01); *B01D 71/32* (2013.01); *C01B 17/021* (2013.01); *C01B 32/50* (2017.08); *B01D 2252/20405* (2013.01); *B01D 2252/20431* (2013.01); *B01D 2252/20489* (2013.01)

(56) References Cited

U.S. PATENT DOCUMENTS

| | | | |
|---|---|---|---|
| 4,507,275 | A | 3/1985 | Reed |
| 4,508,699 | A | 4/1985 | Schoofs |
| 5,304,361 | A | 4/1994 | Parisi |
| 5,407,466 | A | 4/1995 | Lokhandwala et al. |
| 5,556,449 | A | 9/1996 | Baker et al. |
| 5,558,698 | A | 9/1996 | Baker et al. |
| 5,735,936 | A | 4/1998 | Minkkinen et al. |
| 6,387,159 | B1 | 5/2002 | Butwell et al. |
| 6,508,863 | B1 | 1/2003 | Byrne et al. |
| 9,387,430 | B2 | 7/2016 | Ho et al. |
| 9,593,015 | B2 | 3/2017 | Ballaguet et al. |
| 9,943,802 | B1* | 4/2018 | Ballaguet .............. B01D 53/229 |
| 9,981,848 | B2 | 5/2018 | Ballaguet et al. |
| 2005/0135992 | A1 | 6/2005 | Chow |
| 2010/0310439 | A1 | 12/2010 | Brok et al. |
| 2012/0085973 | A1 | 4/2012 | Jüngst et al. |
| 2012/0168154 | A1 | 7/2012 | Chinn et al. |
| 2015/0298972 | A1* | 10/2015 | Ballaguet .............. B01D 53/229 423/575 |
| 2016/0184771 | A1 | 6/2016 | Kulkarni et al. |
| 2018/0353898 | A1 | 12/2018 | Hamad et al. |
| 2018/0363978 | A1 | 12/2018 | Ballaguet et al. |
| 2019/0105599 | A1 | 4/2019 | Bhuwania et al. |

OTHER PUBLICATIONS

Kargari et al., "Application of Membrane Gas Separation Processes in Petroleum Industry", Advances in Petroleum Engineering, vol. 1, pp. 592-622.

Merkel, et al, "Comparison of Hydrogen Sulfide Transport Properties in Fluorinated and Nonfluorinated Polymers," Macromolecules 2006, 39, pp. 7591-7600.

Mirfendereski et al., "Selective Removal of H2S from Gas Streams with High CO2 Concentration Using Hollow Fiber Membrane Contactors", Chem. Eng. Technol. 2019, 42, No. 1, pp. 196-208.

Orme, C. et al; "Mixed gas hydrogen sulfide permeability and separation using supported Polyphosphazines membranes", Journal of Membrane Science, 253, 2005, pp. 243-249.

Perry, D. et al, "Better acid gas enrichment" Flexsorb solvents ExxonMobil Research and Engineering Company, Flexsorb Solvents, Sulphur 326; Jan.-Feb. 2010; pp. 38-42.

* cited by examiner

3a)

3b)

3c)

SULFUR RECOVERY OPERATION WITH IMPROVED CARBON DIOXIDE RECOVERY

INCORPORATION BY REFERENCE

This application claims priority from U.S. Provisional Application No. 62/849,242, filed on May 17, 2019. This application incorporates by reference the contents of the provisional application in its entirety.

TECHNICAL FIELD

The system and methods described relate to improving hydrogen sulfide and carbon dioxide recovery. More specifically, provided are systems and methods for combined amine absorption and membrane gas separation technologies.

BACKGROUND OF THE ART

Acid gas streams with low concentrations of hydrogen sulfide, such as concentrations below 30 mol %, can cause problems in Claus units. The low concentrations of hydrogen sulfide can result in low temperatures in the Claus furnace. At such low temperatures contaminants such as BTX, mercaptans, $C_{2+}$ hydrocarbons cannot be destroyed. The undestroyed contaminants can result in catalyst deactivation in other parts of the Claus unit.

Selective amine absorption technologies can be used to enrich the hydrogen sulfide concentration of the Claus plant feed, but such processes tend to require large and costly columns with limited results increasing the concentration of hydrogen sulfide.

SUMMARY

The system and methods described relate to improving hydrogen sulfide and carbon dioxide recovery. More specifically, provided are systems and methods for combined amine absorption and membrane gas separation technologies.

In a first aspect, a process for recovering sulfur and carbon dioxide from a sour gas stream is provided. The process includes the steps of: providing a sour gas stream to a membrane separation unit, the sour gas stream having hydrogen sulfide and carbon dioxide; separating the hydrogen sulfide from the carbon dioxide in the membrane separation unit to obtain a retentate stream and a first permeate stream, wherein the retentate stream includes hydrogen sulfide, wherein the permeate stream comprises carbon dioxide; introducing the retentate stream to a sulfur recovery unit; processing the retentate stream in the sulfur recovery unit to produce a sulfur stream and a tail gas stream, wherein the sulfur stream comprises liquid sulfur; introducing the permeate stream to an amine absorption unit; and processing the permeate stream in the amine absorption unit to produce an enriched carbon dioxide stream.

According to at least one embodiment, the retentate stream can have a concentration of hydrogen sulfide between 80 and 95 mol %. The membrane separation stage includes a carbon dioxide-selective membrane. The membrane can have carbon dioxide-hydrogen sulfide selectivity of at least 10 and permeance of at least 500 gas permeation units (gpu). The membrane can be made from a perfluoropolymer.

According to at least one embodiment, the membrane separation unit includes two membrane stages in a retentate-in-series configuration. According to at least another embodiment, the membrane separation unit includes two membrane stages in a permeate-in-series configuration.

In a second aspect, a process for recovering sulfur and carbon dioxide from a sour gas stream is provided. The process includes the steps of: providing a sour gas stream to a selective amine absorption unit, the sour gas stream having hydrogen sulfide and carbon dioxide; separating the hydrogen sulfide from the carbon dioxide in the selective amine absorption unit to produce an enriched carbon dioxide stream and enriched hydrogen sulfide stream, wherein the enriched carbon dioxide stream includes carbon dioxide; introducing the enriched hydrogen sulfide stream to a membrane separation stage, wherein the enriched hydrogen sulfide stream includes hydrogen sulfide and carbon dioxide; separating the hydrogen sulfide from the carbon dioxide of the enriched hydrogen sulfide stream in the membrane separation stage to produce a retentate stream and a permeate stream; introducing the retentate stream to a sulfur recovery unit, wherein the retentate stream includes hydrogen sulfide; and processing the retentate stream in the sulfur recovery unit to produce a sulfur stream and a tail gas stream, wherein the sulfur stream includes liquid sulfur.

According to at least one embodiment, the concentration of hydrogen sulfide in the retentate stream can be between 80 and 95 mol %. The membrane separation stage includes a carbon dioxide-selective membrane. The membrane separation unit includes a membrane, wherein the membrane has carbon dioxide-hydrogen sulfide selectivity of at least 10 and permeance of at least 500 gpu.

According to at least one embodiment, the membrane separation unit includes a membrane made from a perfluoropolymer. According to at least another embodiment, the tail gas stream is recycled to the selective amine absorption unit.

According to at least one embodiment, the membrane separation unit includes two membrane stages in a retentate-in-series configuration. According to at least another embodiment, the membrane separation unit includes two membrane stages in a permeate-in-series configuration.

In a third aspect, a process for recovering sulfur and carbon dioxide from two sour gas streams is provided; the first sour gas stream having concentrations of carbon dioxide and hydrogen sulfide greater than 10 mol % and a concentration of nitrogen less than 10 mol %, and the second sour gas stream having concentrations of carbon dioxide and hydrogen sulfide less than 20 mol % or a concentration of nitrogen greater than 10 mol %. The process includes the steps of: introducing the first sour gas stream to a membrane separation unit and separating the first sour gas stream to obtain a retentate stream and a permeate stream, the retentate stream including hydrogen sulfide and the permeate stream including carbon dioxide; introducing the permeate stream and the second sour gas stream to a selective amine absorption unit and using an amine absorption process to obtain a recovered hydrogen sulfide stream and an enriched carbon dioxide stream, the recovered hydrogen sulfide stream including hydrogen sulfide and the enriched carbon dioxide stream including carbon dioxide; recycling the recovered hydrogen sulfide stream to the membrane separation unit; and introducing the retentate stream to a sulfur recovery unit and processing the retentate stream using the Claus process to obtain a sulfur stream including sulfur.

According to at least one embodiment, the retentate stream that is introduced to the sulfur recovery unit includes between 80 and 95 mol % hydrogen sulfide. According to at least one embodiment, the membrane separation unit includes two membrane stages in a retentate-in-series configuration. According to at least another embodiment, the membrane separation unit includes two membrane stages in a permeate-in-series configuration.

The membrane separation unit can include a membrane made from a perfluoropolymer. According to at least one embodiment, the membrane separation unit includes a membrane having carbon dioxide-hydrogen sulfide selectivity of at least 10 and permeance of at least 500 gpu. According to at least one embodiment, the second sour gas stream comprises between 5 and 50 mol % nitrogen.

BRIEF DESCRIPTION OF THE DRAWINGS

These and other features, aspects, and advantages of the present embodiments will become better understood with regard to the following descriptions, claims, and accompanying drawings. It is to be noted, however, that the drawings illustrate only several embodiments of and are therefore not to be considered limiting of the scope as it can admit to other equally effective embodiments.

DETAILED DESCRIPTION

Figure 1:
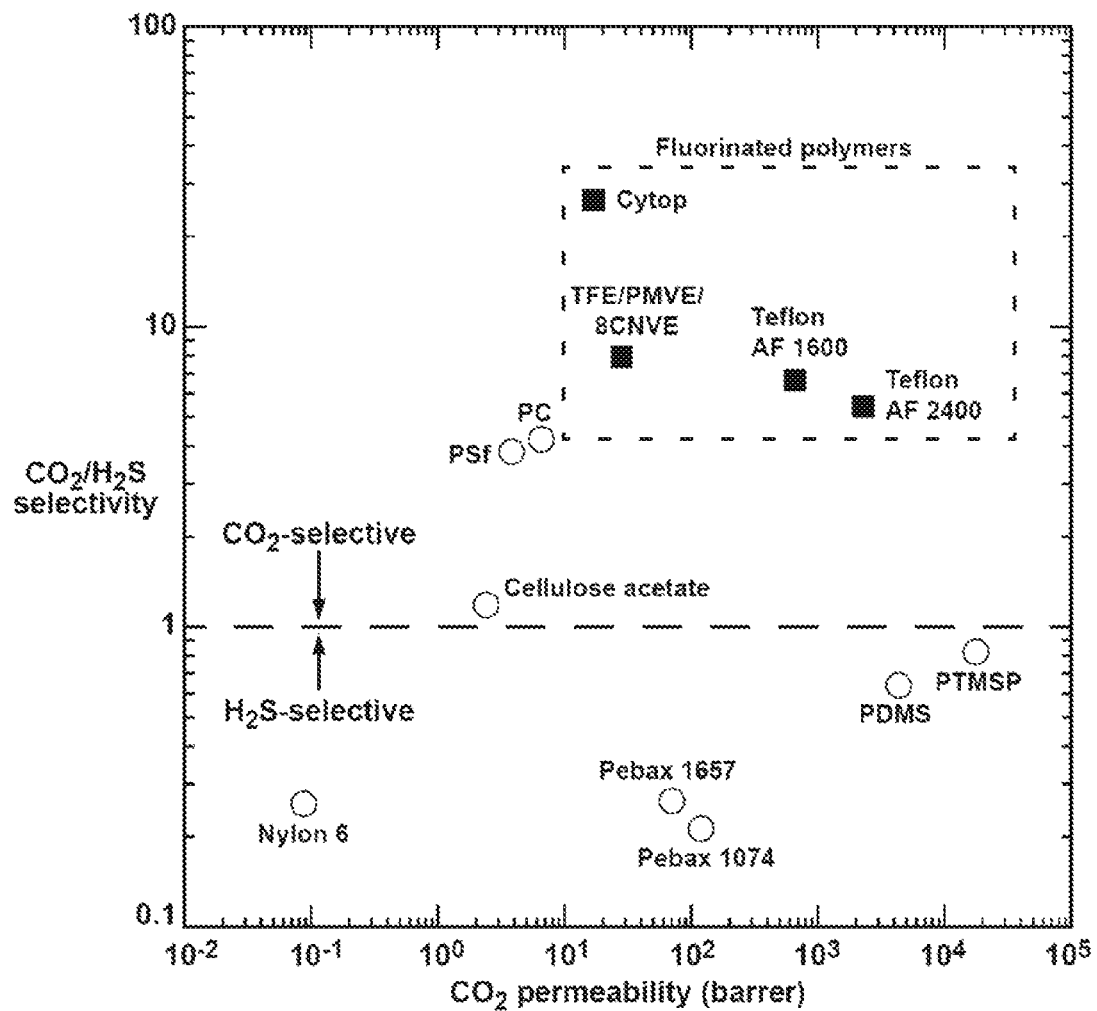
FIG. 1 is a plot of carbon dioxide-hydrogen sulfide selectivity and carbon dioxide permeability for various membrane materials.

While several embodiments will be described, it is understood that one of ordinary skill in the relevant art will appreciate that many examples, variations and alterations to the apparatus and methods described herein are within the scope and spirit of the embodiments. Accordingly, the exemplary embodiments described herein are set forth without any loss of generality, and without imposing limitations, on the claimed embodiments.

The embodiments described here are directed to hybrid processes and systems containing both membrane separation units and amine absorption processes to produce enriched hydrogen sulfide gas streams and enriched carbon dioxide gas streams. Advantageously, the hybrid process results in an overall sulfur recovery process with enhanced efficiency and economics compared to a conventional process. Advantageously, the processes and systems described here can remove carbon dioxide resulting in an enriched hydrogen sulfide stream to the sulfur recovery unit, which can reduce the amount of carbon dioxide in the tail gas treatment process of the Claus plant, reducing the complexity and cost to operate of the tail gas treatment process. Advantageously, the combination of membrane separation unit and amine absorption process can reduce or eliminate the accumulation of carbon dioxide due to recycling gases in the Claus plant when the Claus plant feed has high concentration of carbon dioxide. Advantageously, the combination of membrane separation unit and amine absorption process can eliminate the use of an absorption process in the tail gas treatment unit resulting in improved sulfur recovery and reduced capex savings. Advantageously, the combination of membrane separation unit and amine absorption process results in increased recovery of carbon dioxide for use in enhanced oil recovery operations and more efficient sequestration of carbon dioxide as compared to the use of an amine absorption process alone. Advantageously, removal of the contaminants from the feed to the amine absorption process can reduce or eliminate foaming and other operability issues in the amine absorption process. Advantageously, the combination of membrane separation unit and an amine absorption process improves the Claus unit operability and efficiency resulting in improved sulfur recovery and minimized sulfur dioxide emission from the incinerator stack. Advantageously, removing carbon dioxide through the combination of membrane separation unit and amine absorption process results in increased destruction of contaminants in the furnace of the Claus unit and improved efficiency.

As used here, "overall recovery of sulfur" or "sulfur recovery" refers to the percentage of sulfur removed based on the amount of sulfur present in the acid gas feed stream. A recovery of 99.0% means that 99.0% of the sulfur in the acid gas feed stream is recovered as part of the recovered sulfur stream.

As used here, "permeate," as a verb means to spread through or flow through or pass through a membrane of a membrane unit. As an example, liquids and gases can permeate a membrane. As a noun, permeate can refer to the liquids and gases that have permeated the membrane of a membrane unit.

Membrane separation productivity is described by flux, or the volumetric flow of permeate through the membrane (with units of volume per area per time). The permeability of a membrane refers to its flux sensitivity to the average difference in pressure across the membrane (or transmembrane pressure). A useful measure of the separating power of a membrane is its selectivity ($\alpha_{ij}$), which is the ratio of the relative concentrations of components i and j in the permeate stream to those in the feed stream. By convention, the component with greater passage through the membrane is designated as component i so that the selectivity factor is greater than one. The selectivity of a membrane can be determined using the diffusion coefficients, $D_i$ and $D_j$, and gas sorption coefficients, $K_i$ and $K_j$, for the respective components as shown in Equation 1.

$$\alpha_{ij} = \left[\frac{D_i}{D_j}\right]\left[\frac{K_i}{K_j}\right] \qquad \text{Eqn. 1}$$

The ratio of diffusion coefficients for the two components is referred to as the mobility selectivity, and the ratio of sorption coefficients is referred to as sorption selectivity. For polymer membranes, smaller molecules generally diffuse more readily than larger molecules, which results in a larger diffusion coefficient. On the other hand, smaller molecules generally result in a smaller sorption coefficient because they are less condensable than larger molecules. When the two components to be separated are hydrogen sulfide and carbon dioxide, mobility selectivity favors carbon dioxide (kinetic diameter of 3.3 Å) over hydrogen sulfide (kinetic diameter of 3.6 Å); and sorption selectivity favors hydrogen sulfide over carbon dioxide.

Generally, the sorption selectivity term for a hydrogen sulfide-selective membrane predominates over the mobility selectivity term; and vice versa for a carbon dioxide-selective membrane. An example of a type of hydrogen sulfide-selective membrane includes rubbery polar membranes. An example of a type of carbon dioxide-selective membrane includes glassy hydrophobic polymers. FIG. 1 shows a logarithmic plot of permeability and selectivity for various materials. The plot shows that the perfluorinated family of polymers has suitable carbon dioxide/hydrogen sulfide selectivity combined with suitable carbon dioxide permeability. Membranes made of these materials are particularly suitable for use in the processes described in this disclosure.

In some embodiments, the membrane can have a carbon dioxide/hydrogen sulfide selectivity of at least 10 and a carbon dioxide permeance of at least 500 gpu. In some instances, membranes having carbon dioxide/hydrogen sulfide selectivity of 20 are used. In some instances, membranes having carbon dioxide/hydrogen sulfide selectivity of 30 are used. In some instances, the membrane can have carbon dioxide/hydrogen sulfide selectivity between about 10 and 30.

Figure 2:
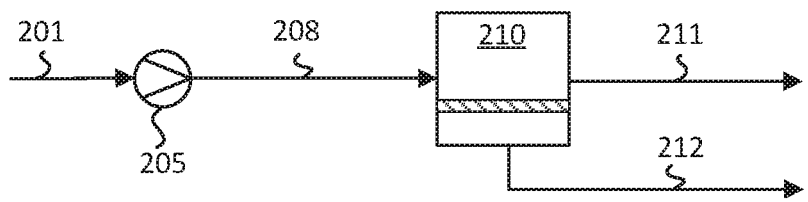
FIG. 2 is an illustration of various membrane stage configurations of a membrane separation unit.
Figure 2:
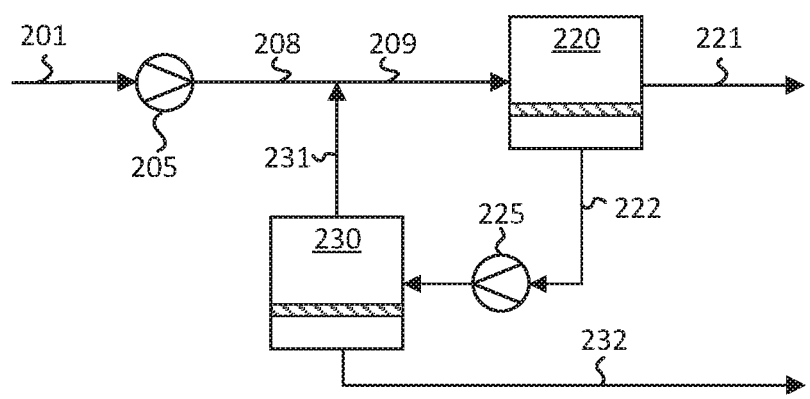
Figure 2:
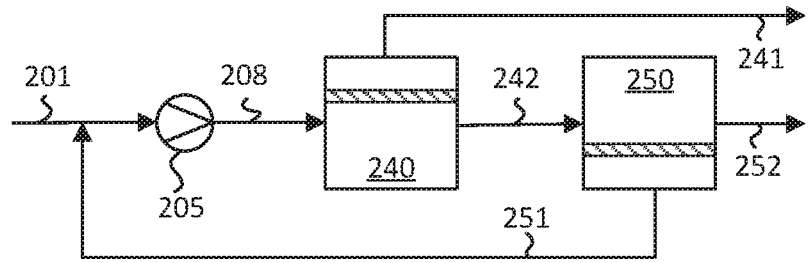

A membrane stage can include one or multiple membrane modules in various configurations. By way of example, various membrane stage configurations are shown in FIG. 2: a single-pass membrane configuration in FIG. 2a; a two-stage configuration with permeate in series in FIG. 2b; and a two-stage configuration with retentate in series in FIG. 2c.

FIG. 2a is the simplest configuration with a single membrane stage. In FIG. 2a, feed-gas stream 201 is compressed in first compressor 205 to obtain compressed feed-gas stream 208. Compressed feed-gas stream 208 is fed to single-pass membrane stage 210 where it is introduced to a carbon dioxide-selective membrane to obtain single-pass retentate stream 211 and single-pass permeate stream 212; the single-pass retentate stream 211 and the single-pass permeate stream 212 being enriched in hydrogen sulfide and carbon dioxide respectively.

FIG. 2b involves two membrane stages with permeate from the first stage being fed to the next stage. In FIG. 2b, feed-gas stream 201 is compressed in first compressor 205 to obtain compressed feed-gas stream 208. The compressed feed-gas stream 208 is combined with second permeate-in-series retentate stream 231 from second permeate-in-series membrane stage 230 to obtain first-stage feed-gas stream 209. The first-stage feed-gas stream 209 is introduced to first permeate-in-series membrane stage 220 where it is separated using a carbon dioxide-selective membrane to obtain first permeate-in-series retentate stream 221 and first permeate-in-series permeate stream 222; the first permeate-in-series retentate stream 221 and the first permeate-in-series permeate stream 222 being enriched in hydrogen sulfide and carbon dioxide respectively. First permeate-in-series permeate stream 222 is compressed in second compressor 225 and then introduced to second permeate-in-series membrane stage 230 where it is separated using a carbon dioxide-selective membrane to obtain second permeate-in-series retentate stream 231 and second permeate-in-series permeate stream 232; the second permeate-in-series retentate stream 231 and the second permeate-in-series permeate stream 232 being enriched in hydrogen sulfide and carbon dioxide respectively. The second permeate-in-series retentate stream 231 is then combined with the compressed feed-gas stream 208.

FIG. 2c involves two membrane stages with retentate from the first stage being fed to the next stage. In FIG. 2c, feed-gas stream 201 is compressed in first compressor 205 to obtain compressed feed-gas stream 208, which is fed to first retentate-in-series membrane stage 240 where it is separated using a carbon dioxide-selective membrane to obtain first retentate-in-series permeate stream 241 and first retentate-in-series retentate stream 242; the first retentate-in-series permeate stream 241 and the first retentate-in-series retentate stream 242 being enriched in carbon dioxide and hydrogen sulfide respectively. The first retentate-in-series retentate stream 242 is then introduced to second retentate-in-series membrane stage 250, where it is separated using a carbon dioxide-selective membrane to obtain second retentate-in-series permeate stream 251 and second retentate-in-series retentate b 252; the second retentate-in-series permeate stream 251 and the second retentate-in-series retentate stream 252 being enriched in carbon dioxide and hydrogen sulfide respectively. The second retentate-in-series permeate stream 251 is combined with feed-gas stream 201 and recycled through the process.

To illustrate the various configurations, examples were simulated using the three configurations shown in FIG. 2 with a feed gas containing 10 vol % hydrogen sulfide and 90 vol % carbon dioxide. The membrane modules were assumed to have enough membrane to produce an enriched sour gas containing 90 vol % hydrogen sulfide. The membrane is assumed to have carbon dioxide permeance of 500 gpu, hydrogen sulfide permeance of 50 gpu, and nitrogen permeance of 20 gpu. These parameters typically result in carbon dioxide-hydrogen sulfide selectivity of about 10, and carbon dioxide-nitrogen selectivity of about 25.

The simulations suggested that the single-pass membrane configuration requires the least membrane area and compression power of the three configurations, but also recovers the least amount of hydrogen sulfide from the feed gas (53% of hydrogen sulfide recovered from feed gas; Table 1). The two-stage configuration with permeate in series recovered the most hydrogen sulfide from the feed gas, but required significantly greater membrane area and theoretical compressor power (Table 2). The two-stage retentate-in-series configuration resulted in intermediate hydrogen sulfide recovery between the single-pass membrane configuration and the two-stage permeate-in-series configuration, with intermediate membrane area and theoretical compressor power (Table 3). The configuration can vary depending on available resources and desired outcomes.

TABLE 1

Stream composition: single-pass membrane configuration[a]

|  | Pressure (bar)[b] | $H_2S$ (mol %) | $CO_2$ (mol %) | Flow rate (mmscfd) |
|---|---|---|---|---|
| Feed-gas stream 201 | 10.0 | 10.0 | 90.0 | 1.0 |
| Single-pass retentate stream 211 | 10.0 | 90.0 | 10.0 | 0.059 |
| Single-pass permeate stream 212 | 1.0 | 5.0 | 95.0 | 0.941 |

[a]Using a membrane area of 132 m², and theoretical compressor power of 116 kilowatts-electric (kWe).
[b]Absolute pressure.

TABLE 2

Stream composition: two-stage permeate-in-series configuration[a]

| | Pressure (bar)[b] | H$_2$S (mol %) | CO$_2$ (mol %) | Flow rate (mmscfd) |
|---|---|---|---|---|
| Feed-gas stream 201 | 1.0 | 10.0 | 90.0 | 1.0 |
| First-stage feed-gas stream 209 | 10.0 | 10.0 | 90.0 | 1.74 |
| First PIS retentate stream 221 | 10.0 | 90.0 | 10.0 | 0.103 |
| First PIS series permeate stream 222 | 1.0 | 5.0 | 95.0 | 1.63 |
| Second PIS retentate stream 231 | 10.0 | 10.0 | 90.0 | 0.74 |
| Second PIS permeate stream 232 | 1.0 | 0.81 | 99.2 | 0.90 |
| PIS, permeate-in-series | | | | |

[a]Using cumulative area of 227 in first PIS membrane stage 220; and theoretical compressor power of 112 kWe and 231 kWe to power first and second compressors 205 and 225 respectively.
[b]Absolute pressure.

TABLE 3

Stream composition: two-stage retentate-in-series (RIS) configuration[a]

| | Pressure (bar)[b] | H$_2$S (mol %) | CO$_2$ (mol %) | Flow rate (mmscfd) |
|---|---|---|---|---|
| Feed-gas stream 201 | 1.0 | 10.0 | 90.0 | 1.00 |
| Compressed feed-gas stream 208 | 10.0 | 10.6 | 89.5 | 1.44 |
| First RIS retentate stream 242 | 10.0 | 25.0 | 75.0 | 0.53 |
| First RIS permeate stream 241 | 1.0 | 2.05 | 98.0 | 0.91 |
| Second RIS retentate stream 252 | 10.0 | 90.0 | 10.0 | 0.09 |
| Second RIS permeate stream 251 | 1.0 | 11.7 | 86.3 | 0.44 |
| RIS, retentate-in-series | | | | |

[a]Using membrane area of 105 and 88 m$^2$ in first and second RIS membrane stages 240 and 250 respectively; and theoretical compressor power of 165 kWe.
[b]Absolute pressure.

Figure 3:
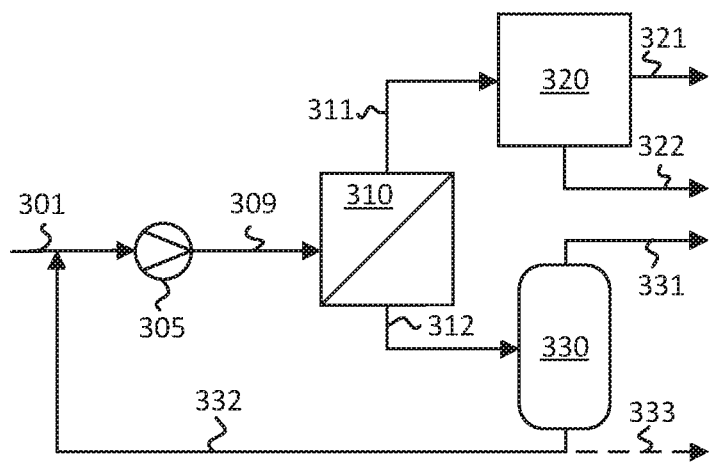
FIG. 3 is an illustration of various process and system configurations for recovering sulfur and carbon dioxide from a sour gas stream.
Figure 3:
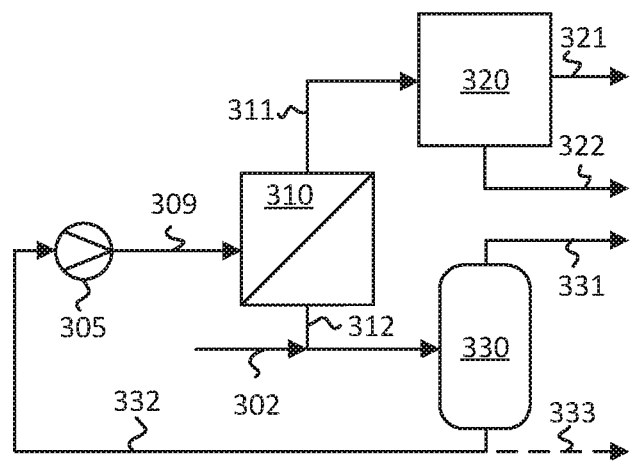
Figure 3:
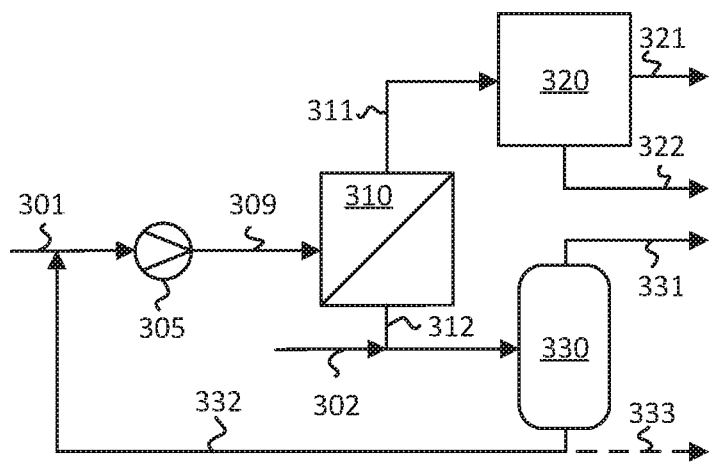

FIG. 3 is an illustration of several processes for separating a sour gas stream, each process having the sour gas introduced at different locations. Referring to FIG. 3a, first sour gas stream 301 is introduced to compressor 305 where it is compressed to obtain compressed sour gas stream 309. Compressed sour gas stream 309 is then introduced to membrane separation unit 310. First sour gas stream 301 can be from any source that produces a gas stream containing acid gases. First sour gas stream 301 can include acid gases and contaminants. Acid gases in first sour gas stream 301 can include hydrogen sulfide, carbon dioxide, and combinations of the same. Contaminants in sour gas stream 301 can include BTX, carbonyl sulfide (COS), carbon disulfide (CS$_2$), thiols (R-SH), water, and combinations of the same. BTX can include benzene, toluene, xylene, and combinations of the same. In at least one embodiment first sour gas stream 301 contains hydrogen sulfide, carbon dioxide, BTX, COS, CS$_2$, R-SH, water, and combinations of the same. The amount of hydrogen sulfide in first sour gas stream 301 is between 20 mol % and 55 mol %, alternately between 20 mol % and 50 mol %, and alternately between 20 mol % and 25 mol %. In at least one embodiment, the amount of hydrogen sulfide in first sour gas stream 301 is between 20 mol % and 25 mol %.

Membrane separation unit 310 can separate hydrogen sulfide from carbon dioxide in compressed sour gas stream 309 to obtain hydrogen sulfide-enriched retentate stream 311 and carbon dioxide-enriched permeate stream 312. Membrane separation unit 310 can include a membrane module having a membrane. The membrane in membrane separation unit 310 can be any type of membrane capable of separating hydrogen sulfide and carbon dioxide. In at least one embodiment, the membrane is a carbon dioxide-selective membrane. According to at least one embodiment, the membrane can be made from a polymer selected from the perfluorinated family of polymers. Though membrane separation unit 310 is illustrated using a single unit, the separation unit may include multiple membrane modules and membrane stages in various configurations. According to at least one embodiment, the membrane separation unit can include any of the three configurations shown in FIG. 2; i.e., single-pass configuration, two-stage permeate-in-series configuration, or two-stage retentate-in-series configuration. One having ordinary skill in the art would conceive of other suitable configurations as well.

Hydrogen sulfide-enriched retentate stream 311 can contain hydrogen sulfide and contaminants. The contaminants in hydrogen sulfide-enriched retentate stream 311 can include BTX, COS, CS$_2$, R-SH, water and combinations of the same. In at least one embodiment, the concentration of hydrogen sulfide in hydrogen sulfide-enriched retentate stream 311 can be between 80 mol % and 95 mol %; for example, between about 90 and 95 mol %. Advantageously, hydrogen sulfide concentrations in this range can be suitable for achieving a temperature profile in the furnace of the Claus unit that is suitable for destroying contaminants. Hydrogen sulfide-enriched retentate stream 311 can be introduced to sulfur recovery unit 320.

Carbon dioxide-enriched permeate stream 312 can contain carbon dioxide, inert gases, and combinations of the same. Carbon dioxide-enriched permeate stream 312 can be introduced to amine absorption unit 330.

Sulfur recovery unit 320 can be any type of system capable of recovering sulfur from hydrogen sulfide and other sulfur-containing contaminants. In at least one embodiment, sulfur recovery unit 320 can be a Claus unit. Sulfur recovery unit 320 can produce sulfur stream 322 and tail gas stream 321. Sulfur stream 322 can contain liquid sulfur. Generally, the sulfur recovery unit 320 requires that the gas fed to the unit contain at least 20 vol % hydrogen sulfide. According to at least one embodiment, hydrogen sulfide-enriched retentate stream 311 contains at least 20 mol % hydrogen sulfide, preferably at least 60 mol % hydrogen sulfide, more preferably at least 80 mol % hydrogen sulfide, and even more preferably at least 90 mol % hydrogen sulfide. According to at least one embodiment, hydrogen sulfide-enriched retentate stream 311 contains between about 80 and 95 mol %, preferably between about 85 and 95 mol % hydrogen sulfide, more preferably between about 90 and 95 mol % hydrogen sulfide.

Claus units are commonly used to recover sulfur from sour gases. Because they typically operate at relatively low pressure (i.e., less than about one bar gauge), Claus units in conventional systems often require larger, more expensive equipment to process the sour gas. And even after processing the sour gas, between about 1 and 2 mol % of the original sulfur may remain in the tail gas. Tail gas from modern Claus units requires additional processing to remove residual sulfur from the tail gas so that it can be safely discharged into the atmosphere. An example of a common tail gas treatment process is the Shell Off-gas Treatment process (SCOT). According to some embodiments, the process can be carried out such that the tail gas stream 321 does not contain a significant amount of sulfur so that tail gas treatment other than oxidation is not necessary. According to at least one embodiment, the process, system, or both are in the absence of a tail gas treatment unit and process (other than simple thermal oxidation). According to at least one embodiment, the process can be carried out without a subsequent tail gas treatment step involving amine absorption. According to at least one embodiment, the system can be in the absence of a tail gas treatment unit configured to treat the tail gas using amine absorption.

Amine absorption unit 330 can be any system capable of recovering carbon dioxide using amine absorption. Though amine absorption unit 330 is shown as a single column, it should be understood that the amine absorption unit 330 can include other equipment in various configurations. For example, one having ordinary skill in the art would consider using one or more absorption columns, one or more stripping columns, other gas-liquid contacting equipment, or combinations of the same in various arrangements. Amine absorption unit 330 can produce treated carbon dioxide stream 331 and recovered hydrogen sulfide stream 332. According to at least one embodiment, the recovered hydrogen sulfide stream 332 can have a concentration of hydrogen sulfide that is in the range of about 10 mol % and about 70 mol %, preferably between about 30 and 70 mol %, more preferably between about 40 and 70 mol %, even more preferably between about 50 and 70 mol %. Treated carbon dioxide stream 331 can be introduced to processes for carbon dioxide sequestration or can be used for enhanced oil recovery processes. Advantageously, having membrane separation stage 310 upstream of amine absorption unit 330 can allow the use of smaller, less costly equipment in amine absorption unit 330. According to at least one embodiment, at least a portion of recovered hydrogen sulfide stream 332 can be removed from the process in bleed stream 333.

FIGS. 3b and 3c are similar to FIG. 3a, except that FIGS. 3b and 3c include a second sour gas stream 302 which is introduced and combined with carbon dioxide-enriched permeate stream 312 after the membrane separation unit 310; and FIG. 3b does not include first sour gas stream 301, the recovered hydrogen sulfide stream 332 being recycled through the process and system without being combined with any other feed stream. According to at least one embodiment, the process and system can include introducing second sour gas stream 302 directly to amine absorption unit 330.

The most suitable configuration will depend on various factors, but particularly the composition of the available gas stream(s). If the sour gas stream includes a substantial amount of nitrogen (i.e., greater than about 10 mol %) or if the sour gas contains less than about 20 mol % hydrogen sulfide, it is generally advantageous to introduce the nitrogen-containing stream to the amine absorption unit. For instance, if a sour gas containing a substantial amount of nitrogen is introduced to the membrane separation stage 310 the nitrogen may be retained in the retentate, resulting in somewhat diluted hydrogen sulfide and greater volumetric flow of the retentate. On the other hand, introducing the nitrogen-containing sour gas to the amine absorption unit allows the nitrogen to be removed with the treated carbon dioxide stream 331.

Figure 4:
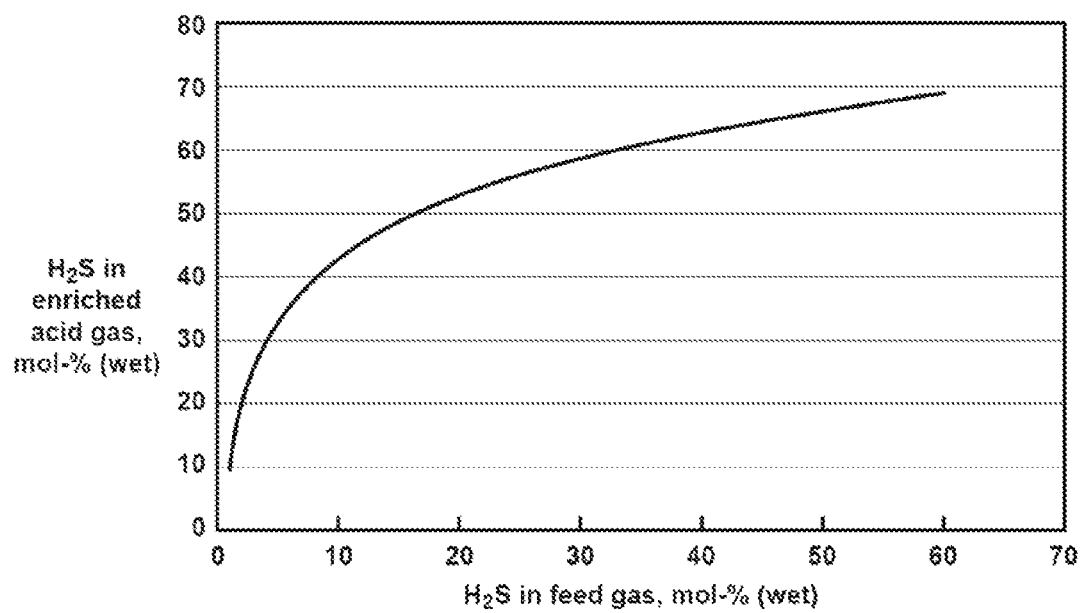
FIG. 4 is a plot of hydrogen sulfide concentration in hydrogen sulfide-enriched acid gas as a function of hydrogen sulfide in the feed gas to a selective amine absorption unit.

The amine absorption process is also suitable for treating a sour gas containing less than about 20 mol % hydrogen sulfide. FIG. 4 shows a plot of hydrogen sulfide concentration in recovered hydrogen sulfide-enriched gas from a selective amine absorption process as a function of concentration of hydrogen sulfide in the feed gas to the process. As shown in FIG. 4, the amine absorption process is most effective at treating a feed gas having a relatively low concentration (i.e., less than about 20 mol %) of hydrogen sulfide. Moreover, the operating cost of stripping dissolved hydrogen sulfide from the solvent in the amine absorption process is also generally lower when the amount of hydrogen sulfide in the feed gas is relatively low.

EXAMPLES

The following examples are included to demonstrate embodiments of the disclosure, and should be considered nonlimiting. Certain examples represent techniques, systems, compositions, and apparatuses discovered to function well in the practice of the disclosure, and thus can be considered to constitute modes for its practice. Changes can be made to the embodiments disclosed in the examples without departing from the spirit and scope of the disclosure.

Figure 5:
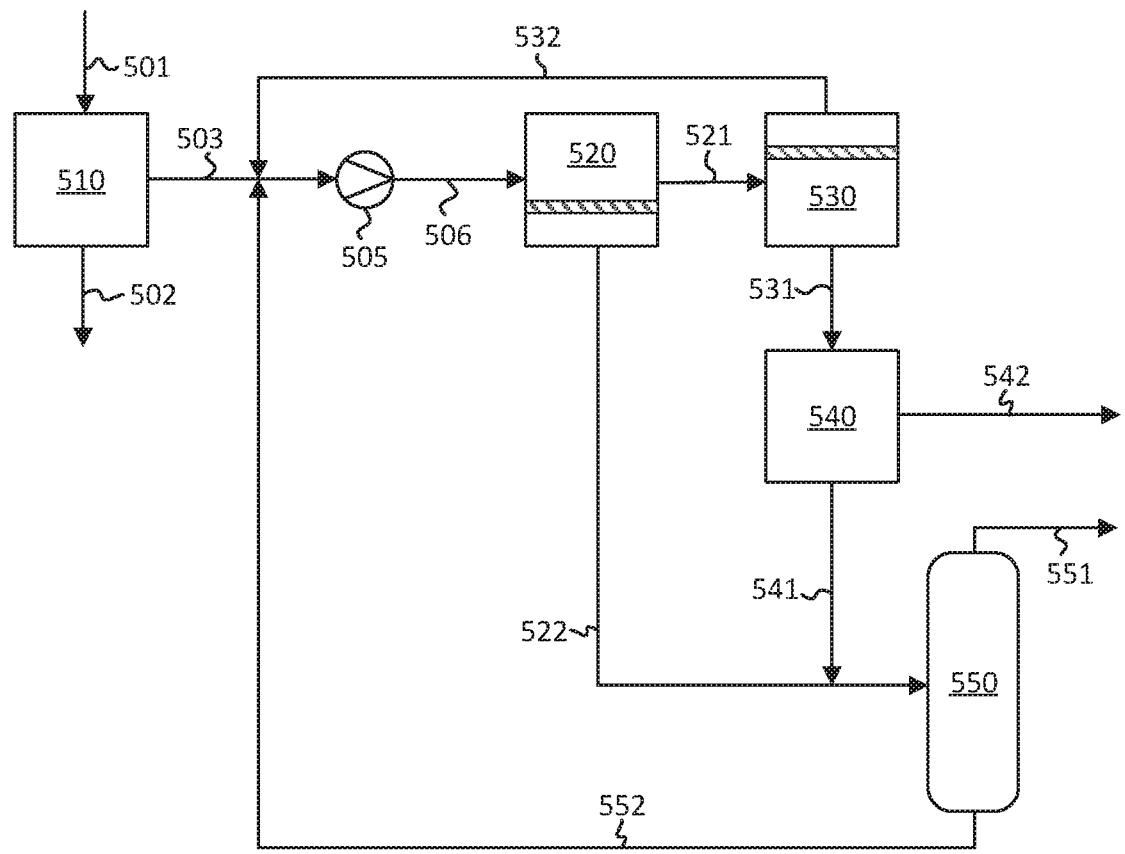
FIG. 5 is an illustration of an embodiment of a process and system using a two-stage retentate-in-series membrane stage configuration with a sour gas being fed to the membrane separation unit.

Example 1: Two-Stage Retentate-In-Series Configuration with Feed to Membrane Separation Unit and Amine Absorption Unit A simulation was carried out using a two-stage retentate-in-series membrane stage configuration with a sour gas being fed to the membrane separation unit. An illustration of the process and system is shown in FIG. 5. The process and system shown in FIG. 5 includes elements and features comparable to those illustrated in FIG. 2c and FIG. 3c. In FIG. 5, a sour natural gas stream 501 is provided having carbon dioxide, hydrogen sulfide, and natural gas. The sour natural gas stream 501 can also include contaminants such as BTX, carbonyl sulfide (COS), carbon disulfide ($CS_2$), thiols (R-SH), water, etc. Sour natural gas stream 501 is treated in natural gas treatment unit 510 by a nonselective acid gas removal process to obtain sweetened natural gas stream 502 and sour gas stream 503. Sour gas stream 503 includes 90 mol % carbon dioxide, 10 mol % hydrogen sulfide, and negligible amount of contaminants. The composition of sour gas stream 503 as it leaves natural gas treatment unit 510 is not suitable for processing in a conventional Claus unit because the concentration of hydrogen sulfide in the stream is insufficient to carry out the thermal step of the Claus process.

The sour gas stream 503 can be combined with other streams containing hydrogen sulfide. In this instance, the sour gas stream 503 is combined with second membrane stage permeate stream 532 and recovered hydrogen sulfide stream 552, and is then compressed using compressor 505 to obtain compressed mixed stream 506. The compressed mixed stream is introduced to a first membrane stage 520 where it is separated to obtain first membrane stage retentate stream 521 and first membrane stage permeate stream 522. The first membrane stage retentate stream 521 is then introduced to a second membrane stage 530 to obtain second membrane stage retentate stream 531 and second membrane stage permeate stream 532.

The first and second membrane stages 520, 530 have carbon dioxide-selective membranes having about 500 gpu carbon dioxide permeance and carbon dioxide-hydrogen sulfide selectivity of about 10. The concentrations of hydrogen sulfide and carbon dioxide in second membrane stage retentate stream 531 are 90 mol % and 10 mol % respectively (Table 4). The concentration of hydrogen sulfide in this stream is suitable for processing in a Claus unit. The second membrane stage retentate stream 531 is then introduced to sulfur recovery unit 540 where it is treated using the Claus process to obtain sulfur stream 542 and tail gas stream 541. Because a substantial amount of carbon dioxide is removed by the first and second membrane stages 520, 530, the tail gas stream 541 has a significantly reduced flow rate compared with a similar tail gas from a conventional process.

Tail gas stream 541 can be combined with sour gas stream 503 or first membrane stage permeate stream 522. In this instance, tail gas stream 541 is combined with first membrane stage permeate stream 522 before being introduced to selective amine absorption unit 550 where it is treated using an amine absorption process to obtain enriched carbon dioxide stream 551 and recovered hydrogen sulfide stream 552. Recovered hydrogen sulfide stream 552 is combined with sour gas stream 503 so that it can be recycled through the process and system.

TABLE 4

Stream composition: two-stage retentate-in-series membrane stage configuration[a] with sour gas fed to the membrane separation unit and selective amine absorption unit

|  | Pressure (bar)[b] | $H_2S$ (mol %) | $CO_2$ (mol %) | Flow rate (mmscfd) |
|---|---|---|---|---|
| Sour gas stream 503 | 2.0 | 10.0 | 90.0 | 10.0 |
| Compressed mixed stream 506 | 15.0 | 11.6 | 88.4 | 17.0 |
| First MS retentate stream 521 | 15.0 | 30.0 | 70.0 | 5.7 |
| First MS permeate stream 522 | 2.0 | 2.5 | 97.5 | 11.0 |
| Second MS retentate stream 531 | 15.0 | 90.0 | 10.0 | 1.1 |
| Second MS permeate stream 532 | 2.0 | 85.0 | 15.0 | 4.5 |
| Tail gas stream 541 | 2.0 | 13.9 | 86.1 | 0.2 |
| Enriched carbon dioxide stream 551 | 2.0 | 0.0 | 100 | 9.0 |
| Recovered hydrogen sulfide stream 552 | 2.0 | 12.1 | 87.9 | 2.6 |

MS, membrane stage

[a]Using membranes having 940 and 720 m$^2$ area in first and second membrane stages 520 and 530 respectively; and theoretical compressor power of 1,590 kWe.
[b]Absolute pressure.

Figure 6:
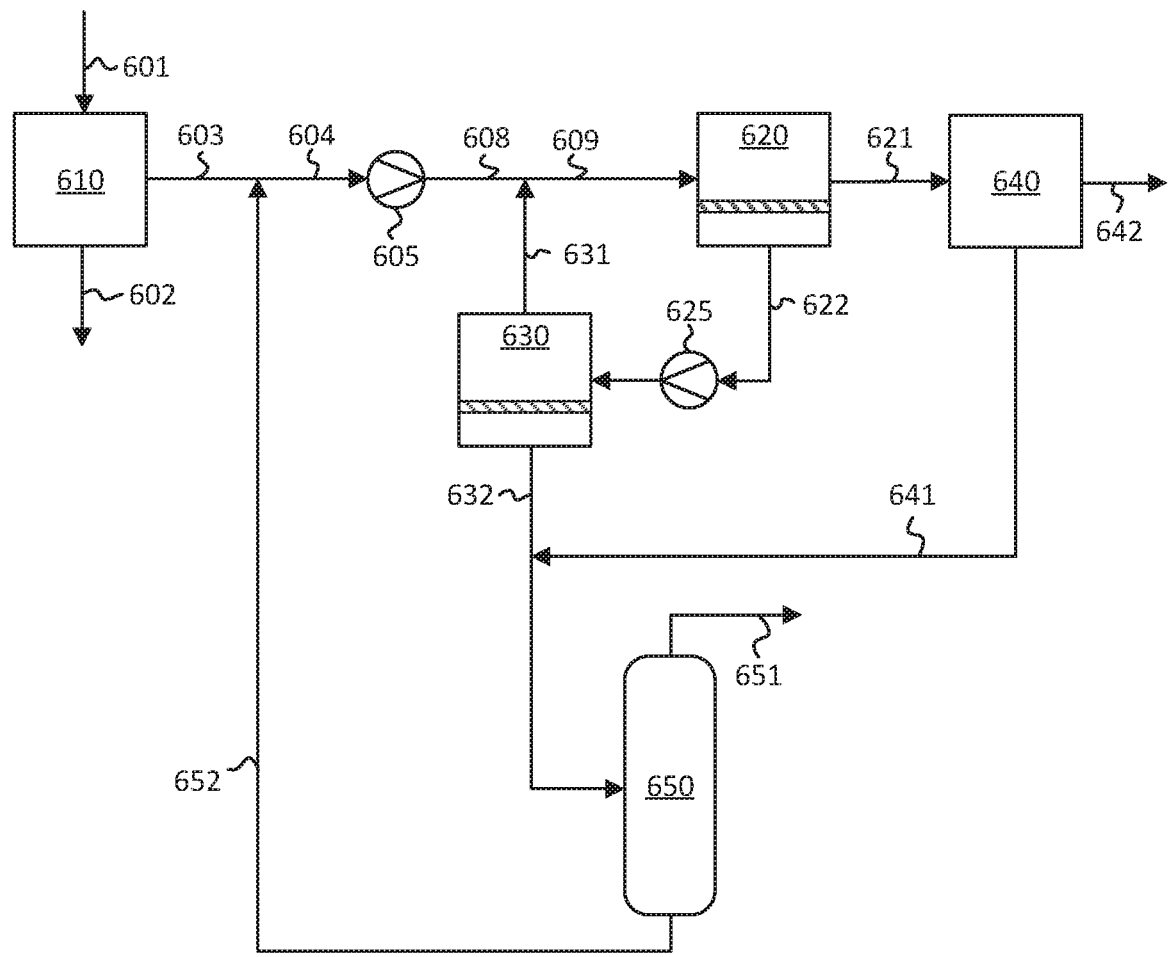
FIG. 6 is an illustration of an embodiment of a process and system using a two-stage permeate-in-series membrane stage configuration with sour gas being fed to the membrane separation unit and selective amine absorption unit.

Example 2: Two-Stage Permeate-In-Series Configuration with Feed to Membrane Separation Unit and Amine Absorption Unit A simulation was carried out using a two-stage permeate-in-series membrane stage configuration with sour gas fed to the membrane separation unit and amine absorption unit as shown in FIG. 6. In this example, the process and system includes elements and features similar to those shown in FIG. 2b and FIG. 3c. The membrane separation unit included two stages with permeate in series, and sour gas was introduced to the membrane separation unit and the amine absorption unit. Similar to Example 1, a sour natural gas stream 601 having the same composition as the sour natural gas stream 501 provided in Example 1 is treated in natural gas treatment unit 610 by a nonselective acid gas removal process to obtain sweetened natural gas stream 602 and sour gas stream 603. As in Example 1, sour gas stream 603 includes 90 mol % carbon dioxide, 10 mol % hydrogen sulfide, and negligible amount of contaminants.

The sour gas stream 603 can be combined with other sour gas streams. In this instance, it is combined with recovered hydrogen sulfide stream 652 from selective absorption unit 650 to obtain mixed sour gas stream 604. Mixed sour gas stream 604 is compressed to 15 bar and combined with second membrane stage retentate stream 631 to obtain compressed mixed stream 609, which is separated in first membrane separation stage 620 to obtain first membrane stage retentate stream 621 and first membrane stage permeate stream 622. The first membrane stage retentate stream 621 is sent to the sulfur recovery unit 640 to obtain sulfur stream 642 and tail gas stream 641. Here, sulfur recovery unit 640 does not include a dedicated amine absorption unit for treating the tail gas from the Claus process, which significantly reduces equipment costs.

The first membrane stage permeate stream 622 is compressed and sent to second membrane stage 630 to obtain second membrane stage retentate stream 631 and second membrane stage permeate stream 632. The second membrane stage permeate stream 632 is combined with tail gas stream 641 and sent to selective amine absorption unit 650.

TABLE 5

Stream composition: two-stage permeate-in-series membrane stage configuration[a] with sour gas fed to the membrane separation unit and selective amine absorption unit

|  | Pressure (bar)[b] | $H_2S$ (mol %) | $CO_2$ (mol %) | $N_2$ (mol %) | Flow rate (mmscfd) |
|---|---|---|---|---|---|
| Sour gas stream 603 | 2.0 | 10.0 | 90.0 | 0.0 | 10.0 |
| Compressed mixed stream 609 | 15.0 | 10.0 | 90.0 | 0.0 | 20.4 |
| First MS retentate stream 621 | 15.0 | 90.0 | 10.0 | 0.0 | 1.1 |
| First MS permeate stream 622 | 2.0 | 5.27 | 94.7 | 0.0 | 19.2 |
| Second MS retentate stream 631 | 15.0 | 10.0 | 90.0 | 0.0 | 9.3 |
| Second MS permeate stream 632 | 2.0 | 0.51 | 99.1 | 0.0 | 10.0 |
| Enriched $CO_2$ stream 651 | 2.0 | 0.01 | 82.7 | 17.3 | 11.0 |
| Recovered $H_2S$ stream 652 | 2.0 | 9.7 | 90.3 | 0.0 | 1.1 |

MS, membrane stage

[a]Using membranes having 1,907 and 723 m$^2$ area in first and second membrane stages 620 and 630 respectively; and theoretical compressor power of 1,720 kWe.
[b]Absolute pressure.

Figure 7:
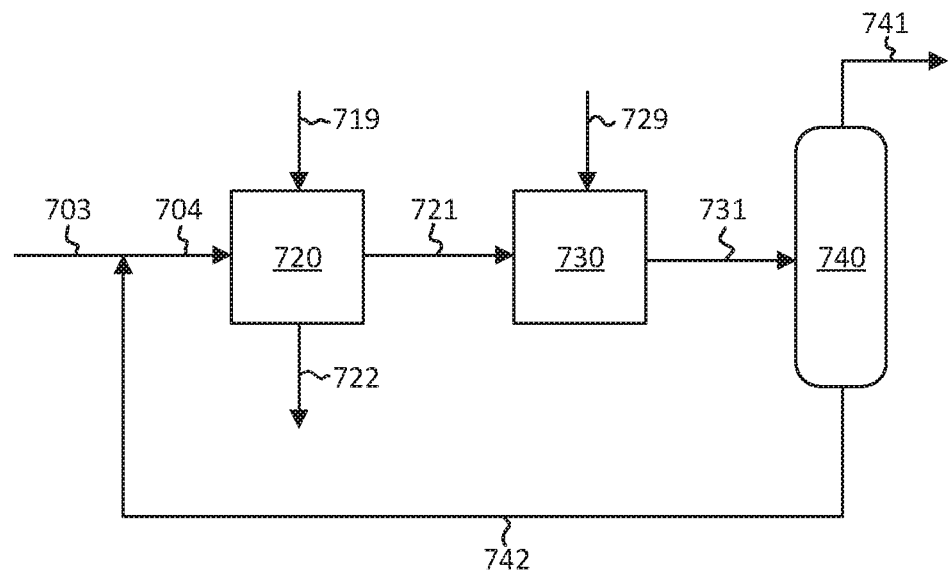
FIG. 7 is an illustration and comparison of two processes for recovering sulfur and carbon dioxide from a sour gas stream, one having a membrane separation stage and another without a membrane separation stage.
Figure 7:
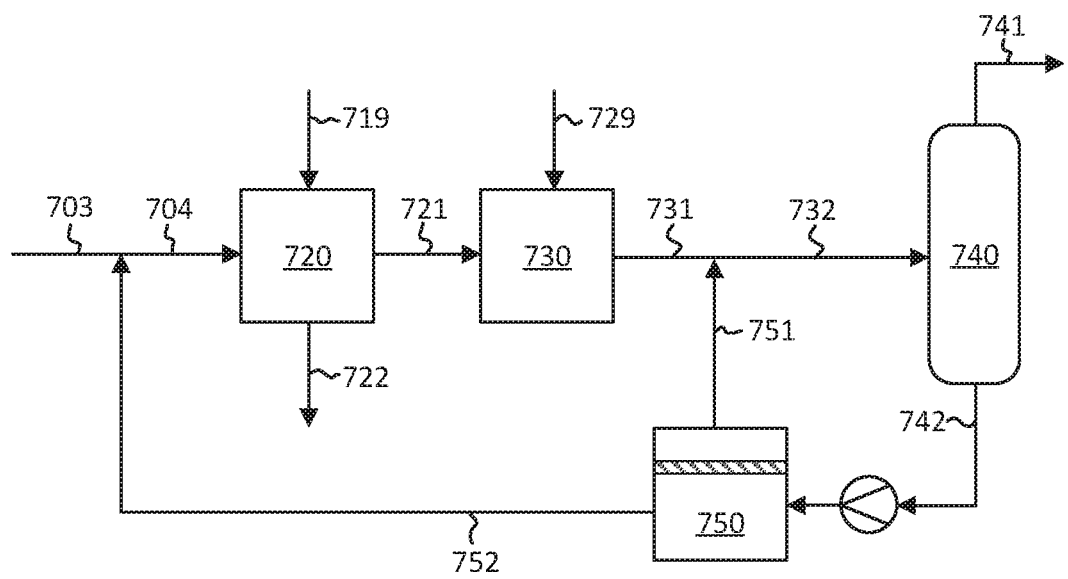

Example 3: Sulfur Recovery Process Comparison with, and without Membrane Separation Refineries may have operations that produce sour gas suitable for direct processing in a sulfur recovery unit. In some instances, the concentration of hydrogen sulfide in such streams can be greater than about 90 mol %, with less than about 10 mol % carbon dioxide. Such streams may be fed directly to the sulfur recovery unit without processing to enrich hydrogen sulfide. However, it is possible for carbon dioxide from the recycle stream to accumulate in the system and reduce the effectiveness of the sulfur recovery unit. An example of such a system is shown in FIG. 7a. In FIG. 7a, sour gas stream 703 contains 90 mol % hydrogen sulfide and 10 mol % carbon dioxide. The stream also contains very small amounts of contaminants (i.e., less than about 0.01 mol %). In FIG. 7a, sour gas stream 703 is combined with hydrogen sulfide-enriched stream 742 and then introduced to Claus reactor 720 where it is reacted with air from air stream 719 to obtain sulfur stream 722 and tail gas stream 721. The tail gas stream 721 is treated in catalytic reactor 730 with hydrogen from hydrogen stream 729 to reduce remaining sulfur components to hydrogen sulfide. Off-gas stream 731 contains between about 1 and 2 mol % hydrogen sulfide; it also contains all of the carbon dioxide from the sour gas stream 703 and nitrogen from air stream 719.

The off-gas stream 731 is sent to a selective amine absorption unit 740 to remove the hydrogen sulfide. The selective amine absorption unit 740 produces a treated tail-gas stream 741 that contains nitrogen and carbon dioxide, and a hydrogen sulfide-enriched stream 742 that contains hydrogen sulfide and carbon dioxide where carbon dioxide is the dominant component. Hydrogen sulfide-enriched stream 742 is combined with sour gas stream 703 to obtain mixed sour gas stream 704, which is significantly diluted so that the concentration of hydrogen sulfide in the mixed sour gas stream 704 is less than 75 mol % (Table 6).

TABLE 6

Stream composition: sulfur recovery process without membrane separation unit

|  | Pressure (bar)$^a$ | $H_2S$ (mol %) | $CO_2$ (mol %) | $N_2$ (mol %) | Flow rate (mmscfd) |
|---|---|---|---|---|---|
| Sour gas stream 703 | 2.0 | 90.0 | 10.0 | 0.0 | 10.0 |
| $H_2S$-enriched stream 742 | 2.0 | 10.7 | 89.3 | 0.0 | 2.6 |
| Mixed sour gas stream 704 | 2.0 | 73.4 | 26.4 | 0.0 | 12.6 |
| Off-gas stream 731 | 2.0 | 1.2 | 14.3 | 84.5 | 23.0 |
| Treated tail-gas stream 741 | 2.0 | 0.0 | 4.8 | 95.2 | 21.0 |

$^a$Absolute pressure.

The concentration of hydrogen sulfide in mixed sour gas stream 704 can be increased using the configuration shown in FIG. 7b. The configuration shown in FIG. 7b involves compressing the recycle stream and then feeding it to membrane separation stage 750 to separate the hydrogen sulfide-enriched stream using a carbon dioxide-selective membrane and obtain permeate stream 751 and retentate stream 752. The membrane separation stage 750 has a carbon dioxide-selective membrane that has carbon dioxide permeance of 500 gpu and carbon dioxide-hydrogen sulfide selectivity of 10. Membranes with greater selectivity would generally be expected to result in better separation of the components, but usually at the expense of permeability so that greater area is needed.

The process shown in FIG. 7b can be used with Claus plants configured with a Shell Claus Off-gas Treating (SCOT) process that includes converting sulfur dioxide in the tail gas to hydrogen sulfide, and removing the hydrogen sulfide using methyl diethanolamine (MDEA) selective absorption. However, this disclosure is not limited to such a process. One of ordinary skill in the art would also consider other possible configurations and variations to obtain similar results.

The retentate stream 752 has a greater concentration of hydrogen sulfide (i.e., 50 mol %) in this configuration than the configuration shown in FIG. 7a. This increased concentration of hydrogen sulfide in retentate stream 752 results in a greater concentration of hydrogen sulfide in the mixed sour gas stream 704 (i.e., 87.9 mol %) as well (Table 7).

TABLE 7

Stream composition: sulfur recovery process with membrane separation unit$^a$

|  | Pressure (bar)$^b$ | $H_2S$ (mol %) | $CO_2$ (mol %) | $N_2$ (mol %) | Flow rate (mmscfd) |
|---|---|---|---|---|---|
| Sour gas stream 703 | 2.0 | 90.0 | 10.00 | 0.0 | 10.0 |
| Mixed sour gas stream 704 | 2.0 | 87.9 | 12.1 | 0.0 | 10.6 |
| Off-gas stream 731 | 2.0 | 1.3 | 6.0 | 92.7 | 21.3 |
| Mixed off-gas stream 732 | 2.0 | 1.55 | 14.2 | 84.2 | 23.4 |
| Treated tail-gas stream 741 | 2.0 | 0.0 | 95.2 | 4.8 | 20.7 |
| $H_2S$-enriched stream 742 | 15.0 | 13.3 | 86.7 | 0.0 | 2.7 |

TABLE 7-continued

Stream composition: sulfur recovery process with membrane separation unit$^a$

|  | Pressure (bar)$^b$ | $H_2S$ (mol %) | $CO_2$ (mol %) | $N_2$ (mol %) | Flow rate (mmscfd) |
|---|---|---|---|---|---|
| Permeate stream 751 | 2.0 | 3.8 | 96.2 | 0.0 | 2.1 |
| Retentate stream 752 | 15.0 | 50.0 | 50.0 | 0.0 | 0.6 |

$^a$Using a membrane having 192 m$^2$ area, and theoretical compressor power of 255 kWe.
$^b$Absolute pressure.

Figure 8:
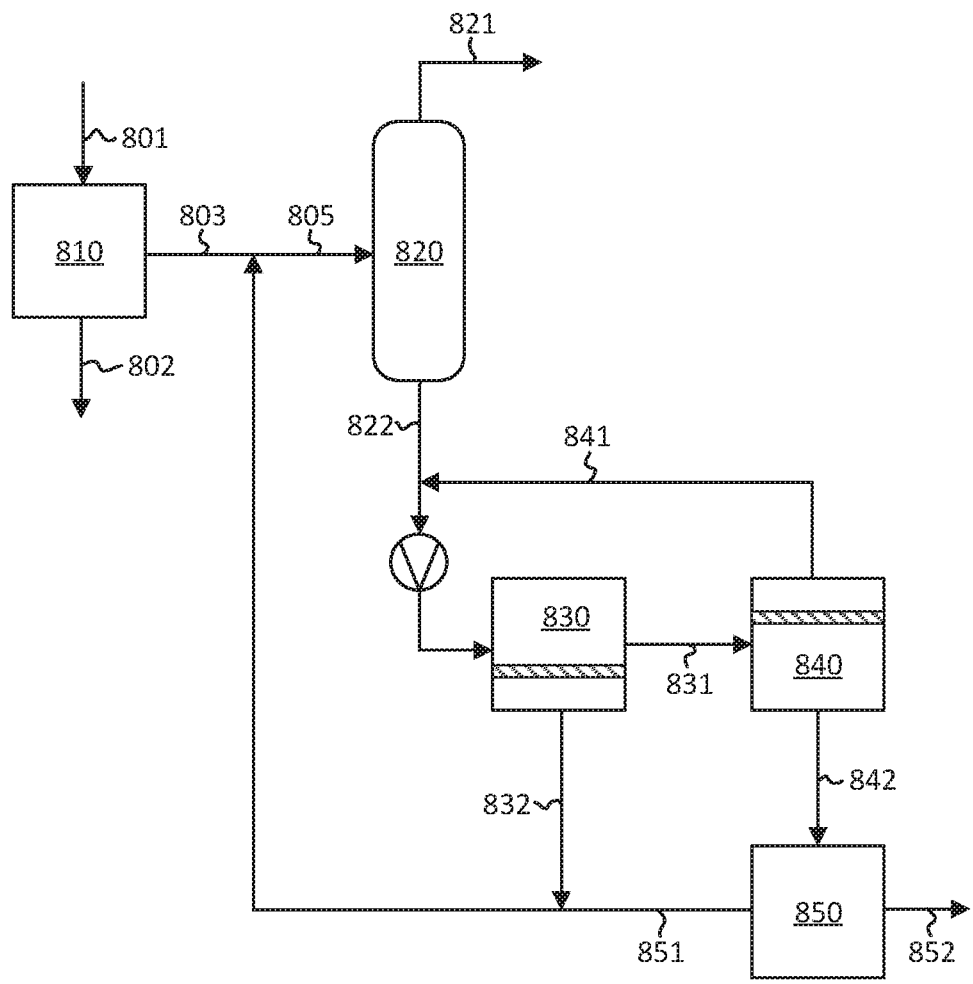
FIG. 8 is an illustration of an embodiment of a process and system using a selective amine absorption unit and a two-stage retentate-in-series membrane stage configuration to recover sulfur and carbon dioxide from a sour gas stream.

Example 4: Low-Concentration Hydrogen Sulfide Feed Using Two-Stage Retentate-In-Series Membrane Separation Configuration A process for treating a stream having a relatively low concentration of hydrogen sulfide without a dedicated amine absorption process for treating the tail gas is provided in this example. An illustration of the process and system is provided in FIG. 8 (Table 8). In FIG. 8, the sour gas stream 803 is combined with first membrane stage permeate stream 832 and tail gas stream 851 to obtain mixed sour gas stream 805, which is separated in selective amine absorption unit 820 to obtain enriched carbon dioxide stream 821 and recovered hydrogen sulfide stream 822.

Because the recovered hydrogen sulfide stream 822 is too dilute to send directly to sulfur recovery unit 850, it is sent to a membrane separation unit to enrich hydrogen sulfide for the sulfur recovery process. The recovered hydrogen sulfide stream 822 is combined with second membrane stage permeate stream 841. The combined recovered hydrogen sulfide stream 822 and second membrane stage permeate stream 841 are introduced to a membrane separation unit that includes two membrane stages with retentate in series, as shown in FIG. 2c. First membrane stage retentate stream 831 is sent to second membrane stage 840 to obtain second membrane stage retentate 842 and second membrane stage permeate 841. The second membrane stage permeate is recycled through the membrane separation unit, and the second membrane stage retentate is sent to sulfur recovery unit 850.

Sulfur recovery unit 850 includes a Claus unit and a catalytic reactor. Because the concentration of hydrogen sulfide in the Claus unit is sufficient to convert but does not include a dedicated selective amine absorption unit for treating the tail gas from the Claus unit.

TABLE 8

Stream composition: two-stage permeate-in-series membrane stage configuration$^a$ with low-concentration hydrogen sulfide

|  | Pressure (bar)$^b$ | $H_2S$ (mol %) | $CO_2$ (mol %) | $N_2$ (mol %) | Flow rate (mmscfd) |
|---|---|---|---|---|---|
| Sour gas stream 803 | 2.0 | 2.0 | 98.0 | 0.0 | 20.0 |
| Mixed sour gas stream 805 | 2.0 | 2.5 | 94.2 | 3.2 | 24.5 |
| Recovered $H_2S$ stream 822 | 20.0 | 15.2 | 84.8 | 0.0 | 4.1 |
| First MS permeate stream 832 | 2.0 | 5.6 | 94.4 | 0.0 | 3.6 |
| First MS retentate stream 831 | 20.0 | 70.0 | 30.0 | 0.0 | 0.75 |
| Second MS retentate stream 842 | 20.0 | 90.0 | 10.0 | 0.0 | 0.46 |

TABLE 8-continued

Stream composition: two-stage permeate-in-series membrane stage configuration[a] with low-concentration hydrogen sulfide

| | Pressure (bar)[b] | H$_2$S (mol %) | CO$_2$ (mol %) | N$_2$ (mol %) | Flow rate (mmscfd) |
|---|---|---|---|---|---|
| Tail gas stream 851 | 2.0 | 1.9 | 5.4 | 91.5 | 0.86 |

MS, membrane stage

[a]Using membranes having 264 and 60 m$^2$ area, and theoretical compressor power of 488 kWe.
[b]Absolute pressure.

Figure 9:
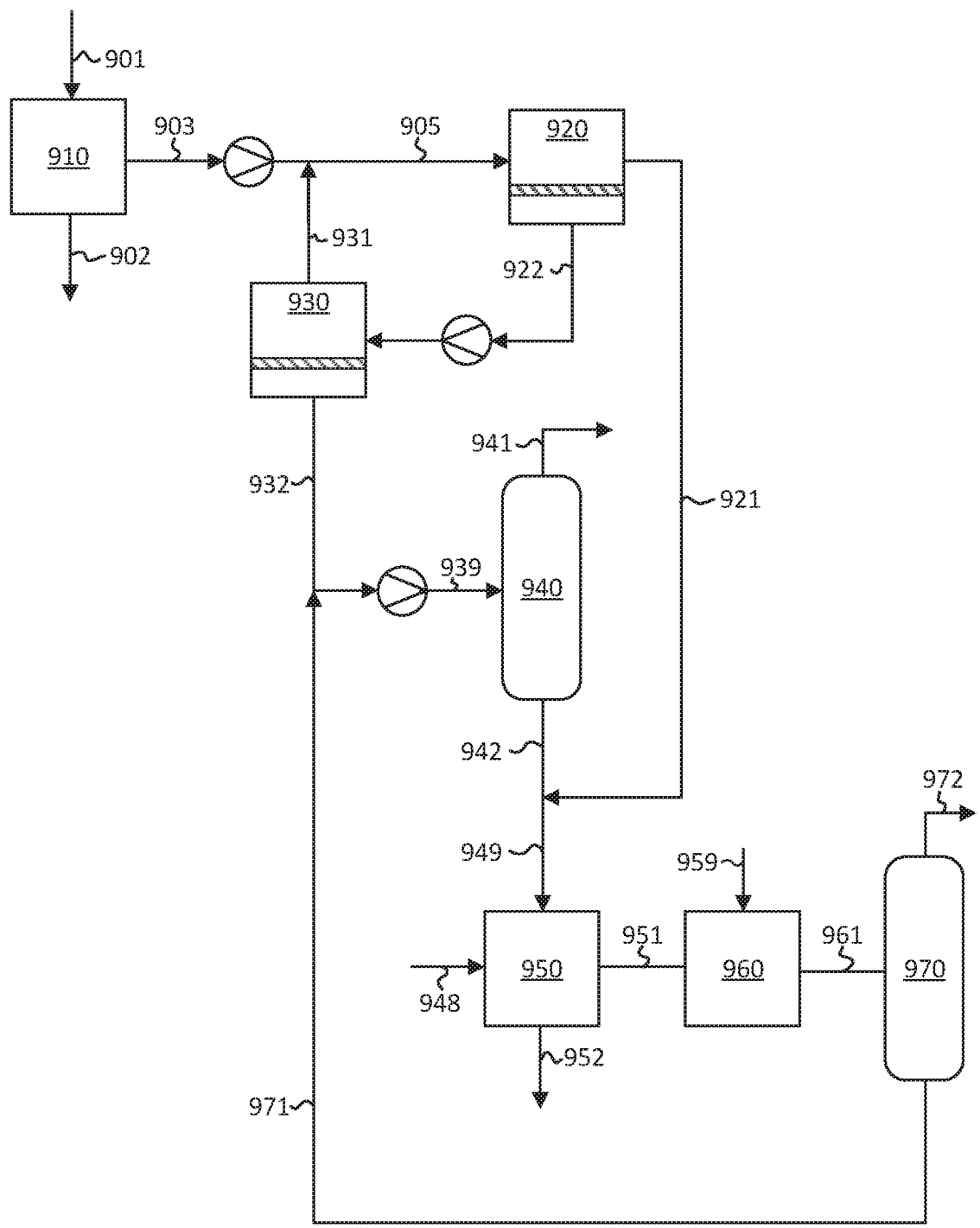
FIG. 9 is an illustration of an embodiment of a process and system using a two-stage permeate-in-series membrane stage configuration with a selective amine absorption unit to recover sulfur and carbon dioxide form a sour gas stream.

Example 6: Two-Stage Permeate-In-Series Membrane Separation Configuration with Feed to Membrane Separation Unit and Amine Absorption Unit A process involving a two-stage permeate-in-series membrane separation configuration with sour gas fed to the membrane separation unit and amine absorption unit was simulated (Table 9). The process and system are shown in FIG. 9, and include elements and features similar to those shown in FIG. 2b and FIG. 3c. In FIG. 9, the sour gas is compressed and introduced to a membrane separation unit having a two-stage permeate-in-series configuration similar to the configuration shown in FIG. 2b. The sour gas stream 903 is suitable for processing in the membrane separation unit because it has a concentration of hydrogen sulfide that is about 20 mol % and does not contain nitrogen, though the concentration of hydrogen sulfide is less preferable because it is relatively low.

The first membrane stage retentate stream 921 is sent to the Claus unit 950. The second membrane stage permeate stream 932 is combined with recycle stream 971 from second amine absorption unit 970 and compressed to obtain first amine unit feed stream 939. First amine unit feed stream 939 is treated in first amine unit 940 to obtain enriched carbon dioxide stream 941 and recovered hydrogen sulfide stream 942. An amine unit is used to process first amine unit feed stream 939 because the stream contains a significant concentration of nitrogen (33.3 mol %) which is problematic for membrane separation processes. Recovered hydrogen sulfide stream is then combined with the first membrane stage retentate stream 921 to obtain Claus feed stream 949.

The Claus feed stream 949 is introduced to the Claus unit 950 with air stream 948 to produce sulfur stream 952 and tail gas stream 951. Tail gas stream 951 is sent to catalytic reactor 960 with hydrogen stream 959 to produce off-gas stream 961 by converting sulfur dioxide present in the tail gas stream into hydrogen sulfide. Off-gas stream 961 is then sent to second amine absorption unit 970 where it is treated to obtain nitrogen stream 972 and recycle stream 971. Recycle stream 971 is suitable for processing in first amine unit 940 because it has a relatively low concentration of hydrogen sulfide (i.e., less than about 20 mol %).

TABLE 9

Stream composition: two-stage permeate-in-series membrane stage configuration[a] with low-concentration hydrogen sulfide

| | Pressure (bar)[b] | H$_2$S (mol %) | CO$_2$ (mol %) | N$_2$ (mol %) | O$_2$ (mol %) | Flow rate (mmscfd) |
|---|---|---|---|---|---|---|
| Sour gas stream 903 | 2.0 | 20.0 | 80.0 | — | — | 10.0 |
| First MS permeate stream 922 | 2.0 | 10.2 | 89.8 | — | — | 11.9 |
| First MS retentate stream 921 | 20.0 | 60.0 | 40.0 | — | — | 2.9 |
| Second MS permeate stream 932 | 2.0 | 3.4 | 95.6 | — | — | 7.1 |
| Off-gas stream 961 | 2.0 | 1.5 | 28.8 | 66.1 | 3.6 | 7.2 |
| First amine unit feed stream 939 | 20.0 | 2.4 | 62.4 | 33.3 | 1.8 | 14.2 |
| Recovered H$_2$S stream 942 | 2.0 | 28.1 | 71.9 | — | — | 1.2 |
| Claus feed stream 949 | 2.0 | 50.5 | 49.5 | — | — | 4.2 |
| Air stream 948 | 2.0 | — | — | 79.0 | 21.0 | 6.0 |

MS, membrane stage

[a]Using membranes having 810 and 390 m$^2$ area.
[b]Absolute pressure.

Although the present embodiments have been described in detail, it should be understood that various changes, substitutions, and alterations can be made hereupon without departing from the principle and scope of the disclosure. Accordingly, the scope of the embodiments should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

As used herein and in the appended claims, the words "comprise," "has," and "include" and all grammatical variations thereof are each intended to have an open, non-limiting meaning that does not exclude additional elements or steps.

The description may use ordinal numbers (such as "first," "second," "third," and so on) merely to identify particular components or steps and distinguish them from others described by the same or similar term. Unless expressly provided otherwise, the use of ordinal numbers does not indicate any relationship, order, quality, ranking, or importance; neither does it define a numerical limit.

What is claimed is:

1. A process for recovering sulfur and carbon dioxide from a sour gas stream, the process comprising the steps of:
    providing a sour gas stream to a membrane separation unit, the sour gas stream comprising hydrogen sulfide and carbon dioxide;
    separating the hydrogen sulfide from the carbon dioxide in the membrane separation unit to obtain a retentate stream and a first permeate stream, wherein the retentate stream comprises hydrogen sulfide, wherein the permeate stream comprises carbon dioxide;
    introducing the retentate stream to a sulfur recovery unit;
    processing the retentate stream in the sulfur recovery unit to produce a sulfur stream and a tail gas stream, wherein the sulfur stream comprises liquid sulfur;
    introducing the permeate stream to an amine absorption unit;
    processing the permeate stream in the amine absorption unit to produce an enriched carbon dioxide stream and a recovered hydrogen sulfide stream; and
    recycling the recovered hydrogen sulfide stream to the membrane separation unit.

2. The process of claim 1, wherein the retentate stream has a concentration of hydrogen sulfide between 80 and 95 mol %.

3. The process of claim 1, the membrane separation unit comprising a membrane wherein the membrane is a carbon dioxide-selective membrane.

4. The process of claim 1, wherein the membrane separation unit comprises a membrane, wherein the membrane has carbon dioxide-hydrogen sulfide selectivity of at least 10 and permeance of at least 500 gas permeation units (gpu).

5. The process of claim 1, wherein the membrane separation unit comprises a membrane made from a perfluoropolymer.

6. The process of claim 1, wherein the membrane separation unit comprises two membrane stages in a retentate-in-series configuration.

7. The process of claim 1, wherein the membrane separation unit comprises two membrane stages in a permeate-in-series configuration.

8. A process for recovering sulfur and carbon dioxide from a sour gas stream, the process comprising the steps of:
    providing a sour gas stream to a selective amine absorption unit, the sour gas stream comprising hydrogen sulfide and carbon dioxide;
    separating the hydrogen sulfide from the carbon dioxide in the selective amine absorption unit to produce an enriched carbon dioxide stream and enriched hydrogen sulfide stream, wherein the enriched carbon dioxide stream comprises carbon dioxide;
    introducing the enriched hydrogen sulfide stream to a membrane separation unit, wherein the enriched hydrogen sulfide stream comprises hydrogen sulfide and carbon dioxide;
    separating the hydrogen sulfide from the carbon dioxide of the enriched hydrogen sulfide stream in the membrane separation unit to produce a retentate stream and a permeate stream;
    introducing the retentate stream to a sulfur recovery unit, wherein the retentate stream comprises hydrogen sulfide;
    processing the retentate stream in the sulfur recovery unit to produce a sulfur stream and a tail gas stream, wherein the sulfur stream comprises liquid sulfur; and
    recycling the permeate stream to the amine absorption unit.

9. The process of claim 8, wherein a concentration of hydrogen sulfide in the retentate stream is between 80 and 95 mol %.

10. The process of claim 8, the membrane separation stage comprises a membrane, wherein the membrane is a carbon dioxide-selective membrane.

11. The process of claim 8, wherein the membrane separation unit comprises a membrane, wherein the membrane has carbon dioxide-hydrogen sulfide selectivity of at least 10 and permeance of at least 500 gpu.

12. The process of claim 8, wherein the membrane separation unit comprises a membrane made from a perfluoropolymer.

13. The process of claim 8, wherein the tail gas stream is recycled to the selective amine absorption unit.

14. The process of claim 8, wherein the membrane separation unit comprises two membrane stages in a retentate-in-series configuration.

15. The process of claim 8, wherein the membrane separation unit comprises two membrane stages in a permeate-in-series configuration.

16. A process for recovering sulfur and carbon dioxide from two sour gas streams, a first sour gas stream having concentrations of carbon dioxide and hydrogen sulfide greater than 10 mol % and a concentration of nitrogen less than 10 mol %, and a second sour gas stream having concentrations of carbon dioxide and hydrogen sulfide less than 20 mol % or a concentration of nitrogen greater than 10 mol %, the process comprising the steps of:
    introducing the first sour gas stream to a membrane separation unit and separating the first sour gas stream to obtain a retentate stream and a permeate stream, the retentate stream comprising hydrogen sulfide and the permeate stream comprising carbon dioxide;
    introducing the permeate stream and the second sour gas stream to a selective amine absorption unit and using an amine absorption process to obtain a recovered hydrogen sulfide stream and an enriched carbon dioxide stream, the recovered hydrogen sulfide stream comprising hydrogen sulfide and the enriched carbon dioxide stream comprising carbon dioxide;
    recycling the recovered hydrogen sulfide stream to the membrane separation unit; and
    introducing the retentate stream to a sulfur recovery unit and processing the retentate stream using the Claus process to obtain a sulfur stream comprising sulfur.

17. The process of claim 16, wherein the retentate stream that is introduced to the sulfur recovery unit comprises between 80 and 95 mol % hydrogen sulfide.

18. The process of claim 16, wherein the membrane separation unit comprises two membrane stages in a retentate-in-series configuration.

19. The process of claim 16, wherein the membrane separation unit comprises two membrane stages in a permeate-in-series configuration.

20. The process of claim 16, wherein the membrane separation unit comprises a membrane made from a perfluoropolymer.

21. The process of claim 16, wherein the membrane separation unit comprises a membrane having carbon dioxide-hydrogen sulfide selectivity of at least 10 and permeance of at least 500 gpu.

22. The process of claim 16, wherein the second sour gas stream comprises between 5 and 50 mol % nitrogen.

23. The process of claim 8, wherein the sour gas stream comprises 10 mol % or greater of nitrogen.

* * * * *